(12) United States Patent
Farabow, III et al.

(10) Patent No.: US 10,161,443 B2
(45) Date of Patent: Dec. 25, 2018

(54) BEARING SHOE FOR SUPPORTING A ROTOR JOURNAL IN A TURBINE ENGINE

(71) Applicant: Siemens Aktiengesellschaft, München (DE)

(72) Inventors: John William Farabow, III, Indian Land, SC (US); Gerald A. Myers, Fort Mill, SC (US); William J. Curtin, Fort Mill, SC (US); Michael Kursch, Dorsten (DE); Lothar K. Schulz, Oviedo, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/544,780

(22) PCT Filed: Jan. 30, 2015

(86) PCT No.: PCT/US2015/013734
§ 371 (c)(1),
(2) Date: Jul. 19, 2017

(87) PCT Pub. No.: WO2016/122579
PCT Pub. Date: Aug. 4, 2016

(65) Prior Publication Data
US 2018/0003221 A1    Jan. 4, 2018

(51) Int. Cl.
*F16C 17/03*    (2006.01)
*F16C 41/04*    (2006.01)
(Continued)

(52) U.S. Cl.
CPC .......... *F16C 17/03* (2013.01); *F16C 33/1045* (2013.01); *F16C 41/04* (2013.01); *F16C 43/02* (2013.01); *F16C 2360/23* (2013.01)

(58) Field of Classification Search
CPC ....................................................... F16C 17/03
See application file for complete search history.

(56) References Cited

U.S. PATENT DOCUMENTS

| | | | | |
|---|---|---|---|---|
| 1,161,721 A | * | 11/1915 | Parsons ................... | F16C 17/03 384/312 |
| 3,053,587 A | * | 9/1962 | Wallgren ................ | F16C 17/03 384/312 |

(Continued)

FOREIGN PATENT DOCUMENTS

| | | |
|---|---|---|
| DE | 102014209062 A1 | 11/2014 |
| EP | 2762735 A1 | 8/2014 |
| WO | 2014208196 A1 | 12/2014 |

OTHER PUBLICATIONS

PCT International Search Report and Written Opinion dated Oct. 1, 2015 corresponding to PCT Application No. PCT/US2015/013734 filed Jan. 30, 2015.

*Primary Examiner* — Thomas R Hannon

(57) ABSTRACT

A rotor journal support system (10) configured to allow for a bearing shoe (16) to properly align to the rotor (14) while keeping the bearing shoe (16) constrained during handling, installation, and operation limit is disclosed. The rotor journal support system (10) may be configured to enable limited movement of a bearing shoe (16) such that when the rotor journal (14) is installed, the bearing shoe (16) is properly aligned with the rotor journal (14), thereby requiring less torque to turn the rotor journal (14) from a stop than when the bearing shoe (16) is misaligned. The rotor journal support system (10) may include bearing shoe supports (88) extending radially outward from the bearing shoe (16). The bearing shoe support (88) may include an outer bearing surface (100) having at least a partial spherical shape configured to bear against the aligning ring (24). In this position, the bearing shoe support (88) enables the bearing shoe (16)

(Continued)

to be moved in any direction other than circumferentially and radially outward.

11 Claims, 11 Drawing Sheets

(51) Int. Cl.
    *F16C 43/02*     (2006.01)
    *F16C 33/10*     (2006.01)

(56) References Cited

U.S. PATENT DOCUMENTS

| | | | | |
|---|---|---|---|---|
| 3,542,441 A | * | 11/1970 | Nixon | F16C 17/02 384/312 |
| 3,604,767 A | | 9/1971 | Decker | |
| 3,610,711 A | * | 10/1971 | Mierley, Sr. | F16C 17/03 277/422 |
| 4,568,204 A | * | 2/1986 | Chambers | F16C 33/1045 384/152 |
| 5,651,616 A | | 7/1997 | Hustak et al. | |
| 5,743,657 A | * | 4/1998 | O'Reilly | F16C 17/03 384/312 |
| 8,292,507 B2 | * | 10/2012 | Hirai | F01D 25/16 384/117 |
| 8,894,286 B2 | * | 11/2014 | Nicholas | F16C 27/02 384/125 |
| 9,534,637 B2 | * | 1/2017 | Livermore-Hardy | F16C 37/002 |
| 2011/0303491 A1 | | 12/2011 | Jenkins | |
| 2014/0147247 A1 | | 5/2014 | Janssen et al. | |
| 2014/0205224 A1 | * | 7/2014 | Hemmi | F16C 17/03 384/311 |
| 2016/0123391 A1 | * | 5/2016 | Minegishi | F04D 29/046 415/170.1 |

* cited by examiner

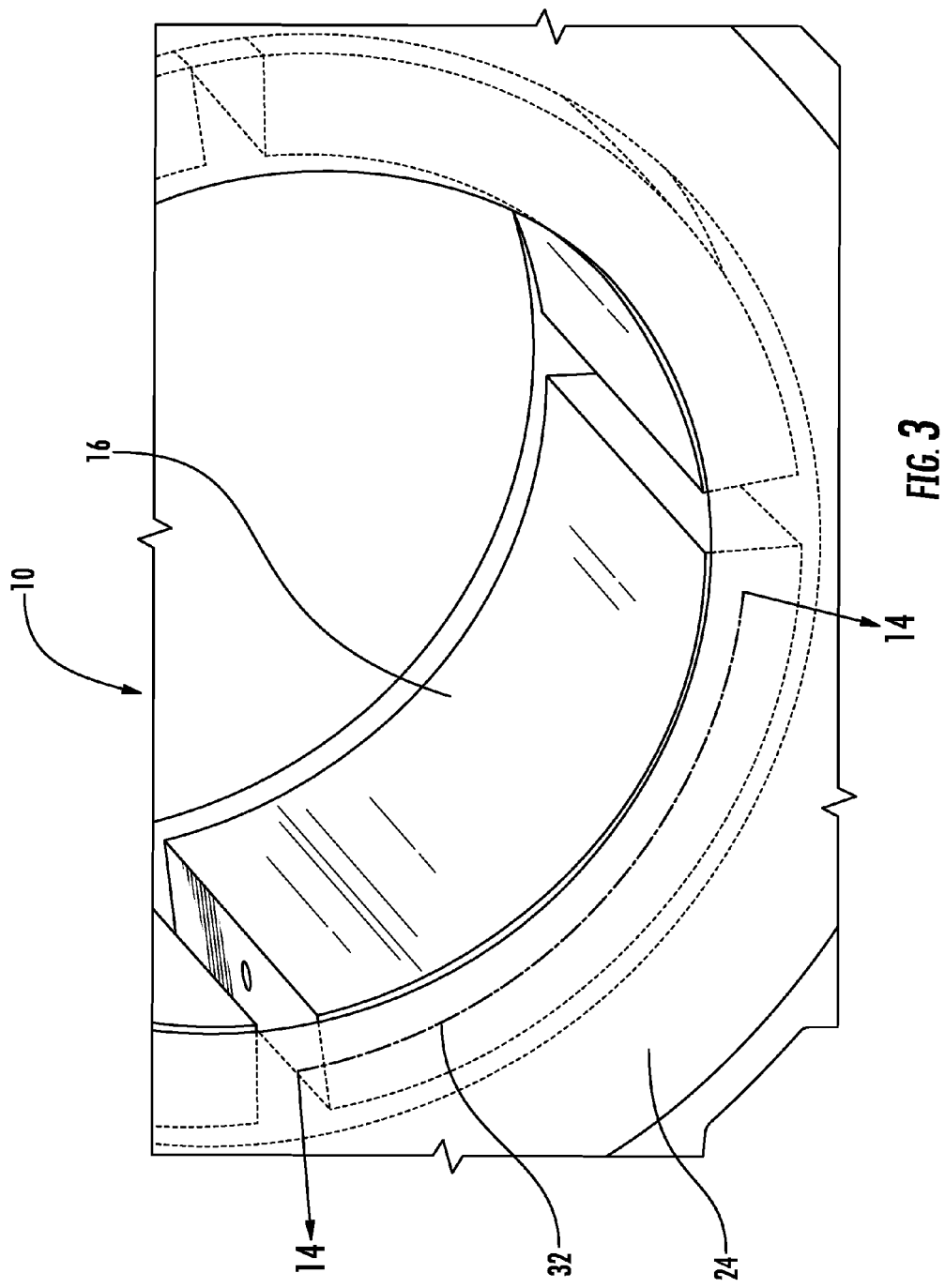

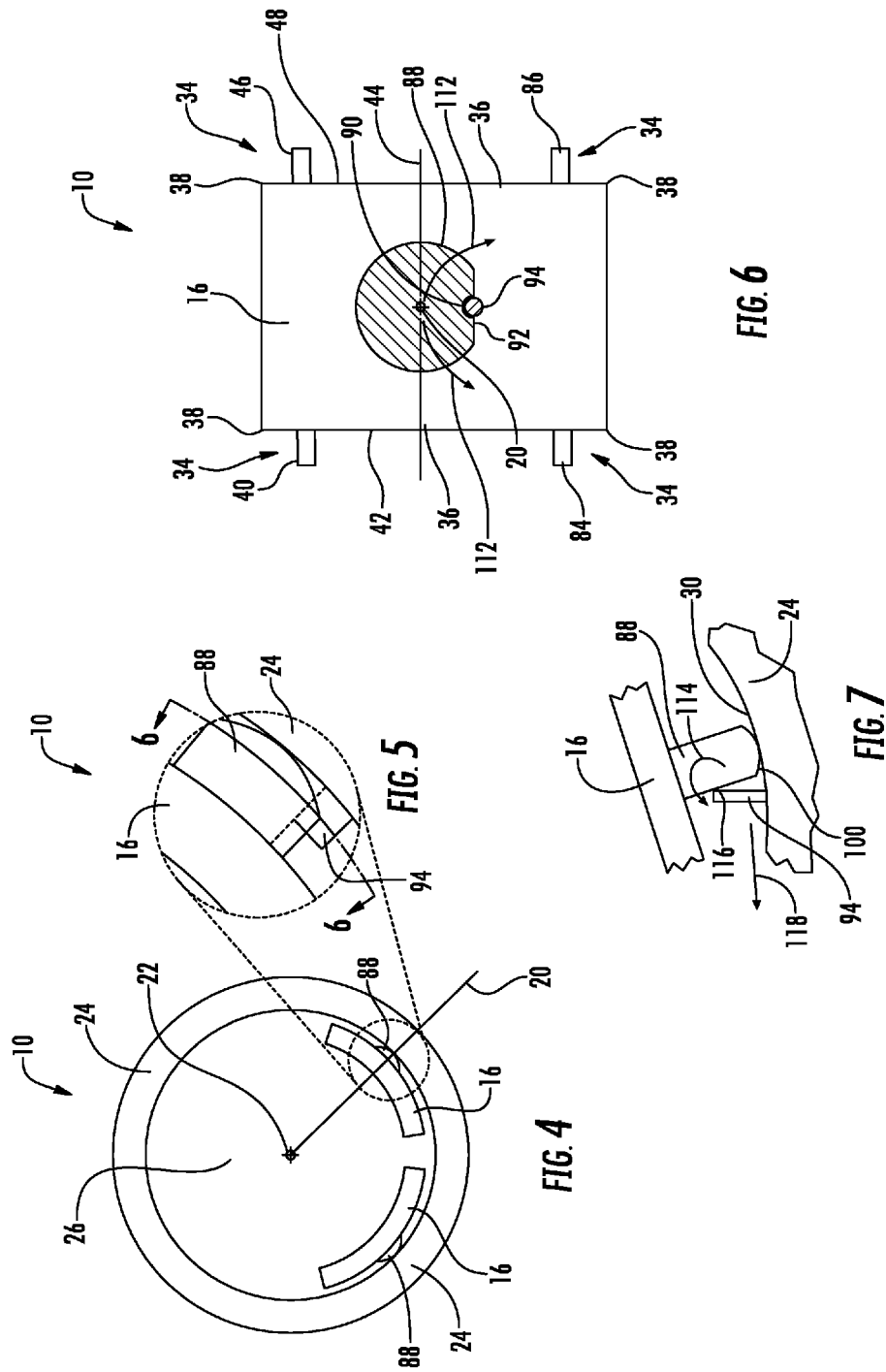

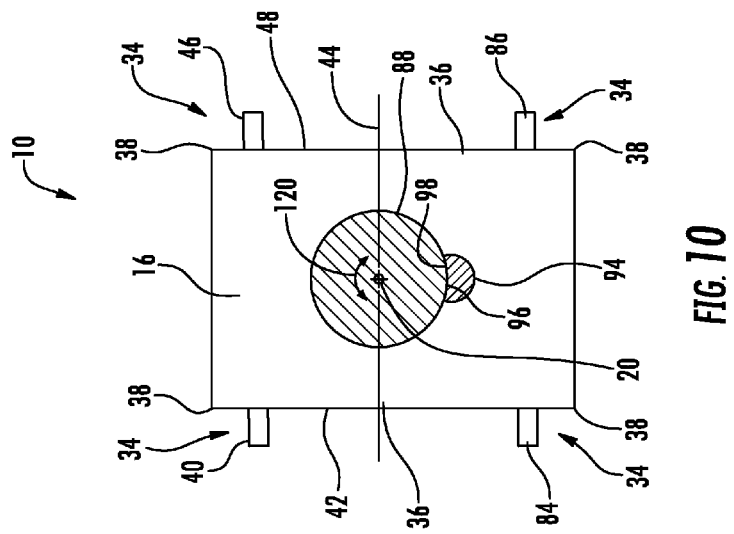
FIG. 10
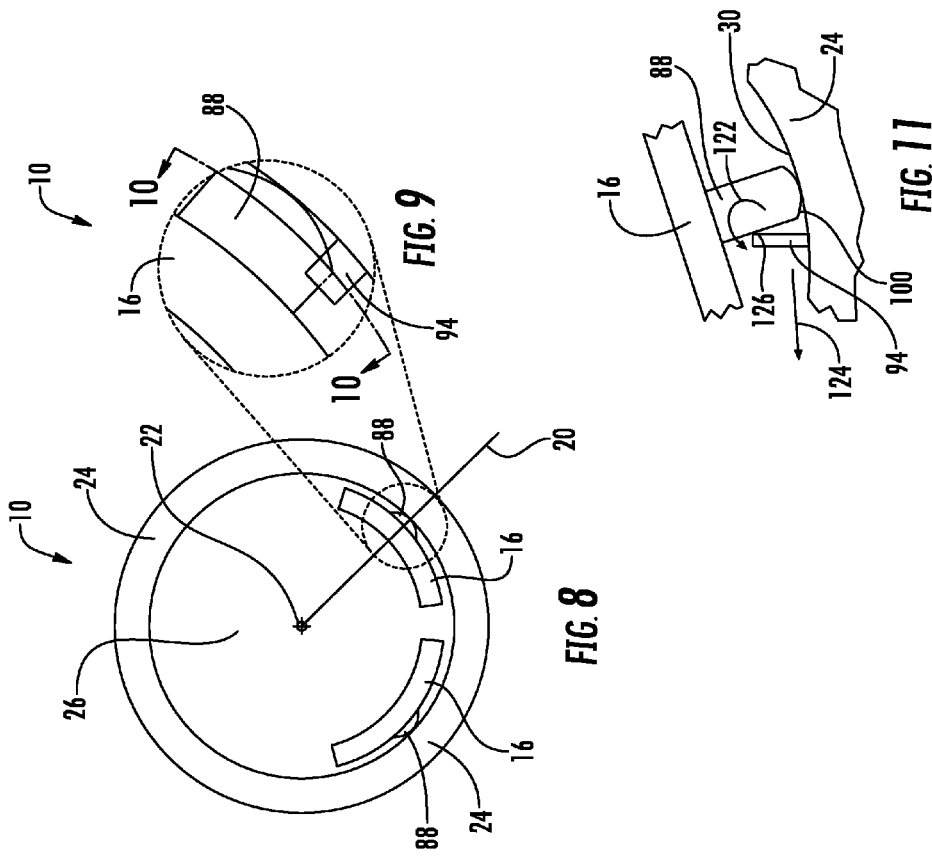
FIG. 11
FIG. 9
FIG. 8

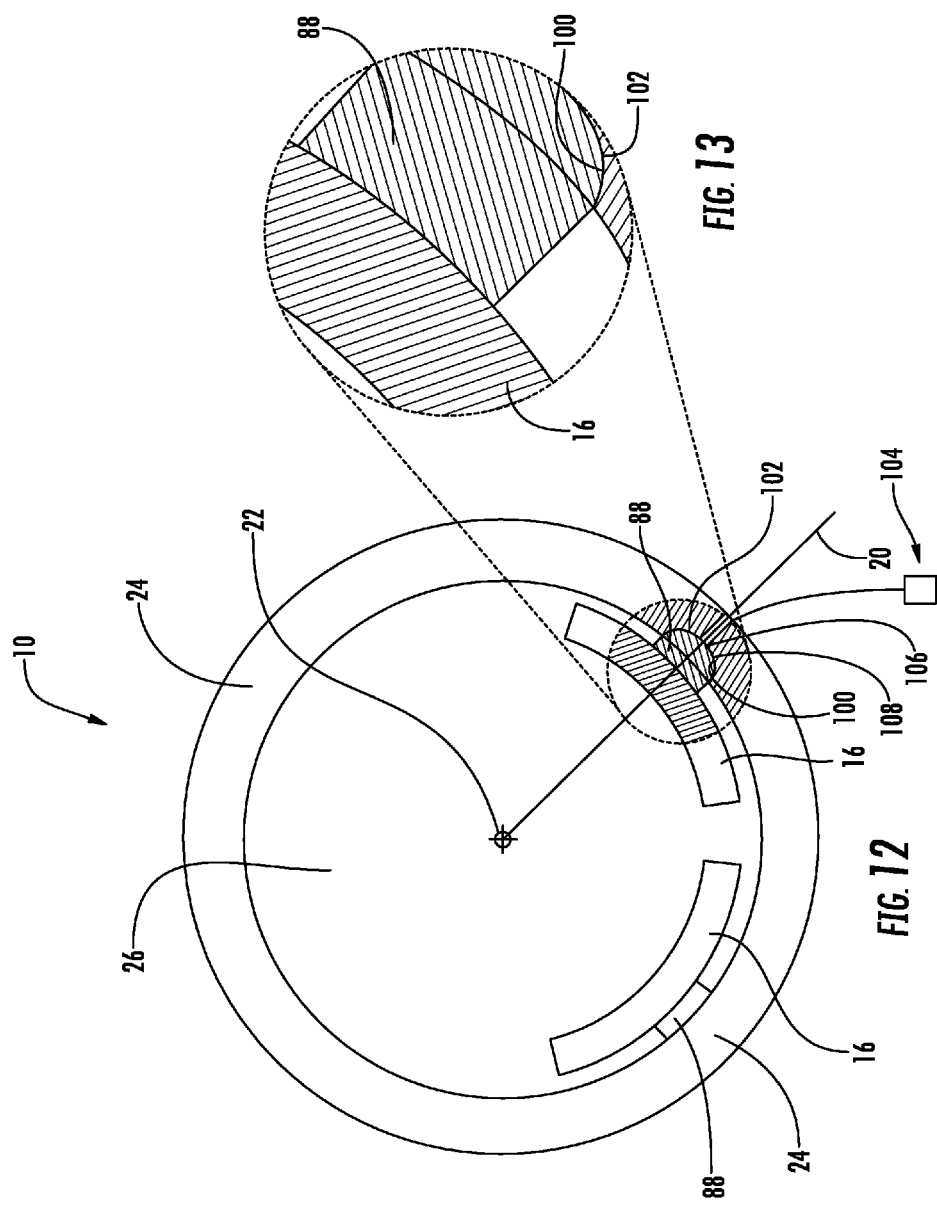

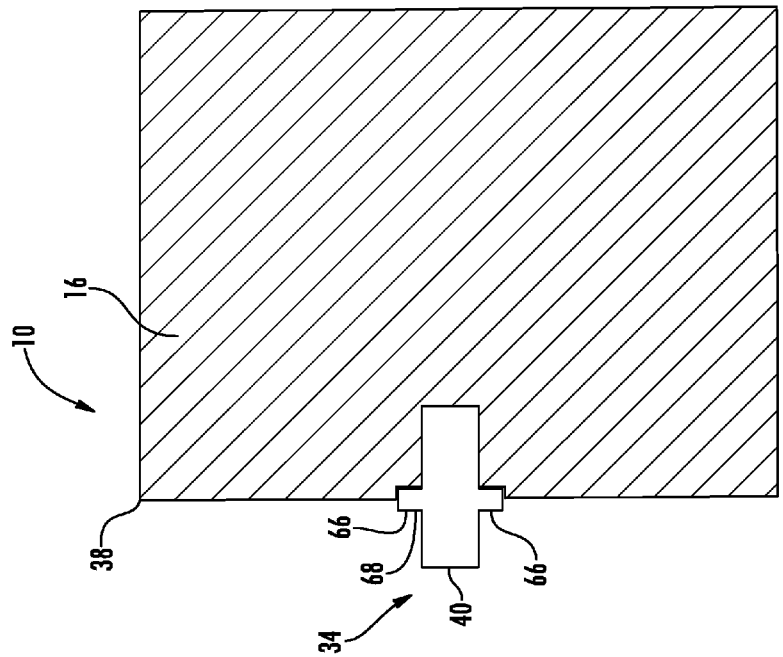
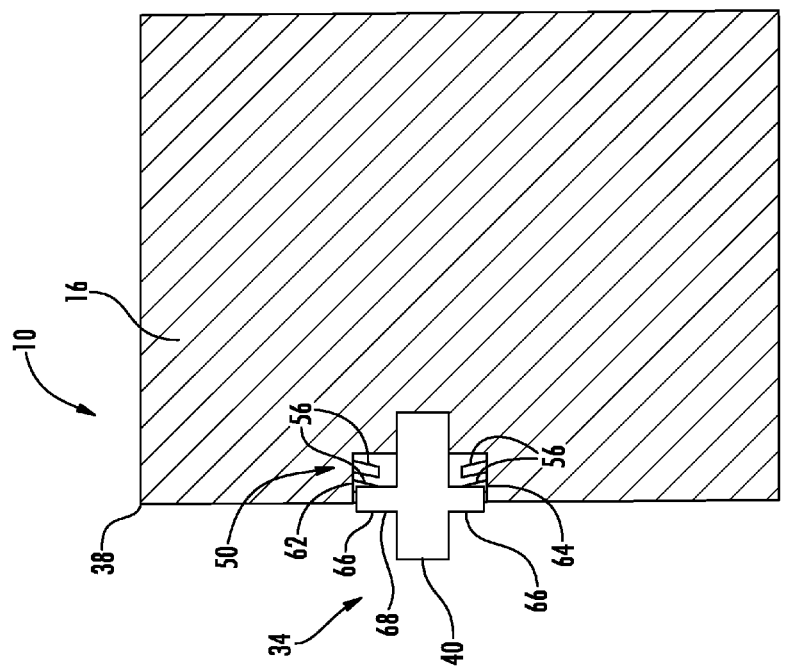

BEARING SHOE FOR SUPPORTING A ROTOR JOURNAL IN A TURBINE ENGINE

This application claims priority to PCT Application No. PCT/US2015/013724 filed Jan. 30, 2015, the contents of which are incorporated herein by reference.

FIELD OF THE INVENTION

This invention is directed generally to support systems for rotor journals and, more particularly, to support systems for rotor journals in turbine engines.

BACKGROUND

Large scale shafts often require use of a tremendous amount of breakaway torque to begin to rotate the shafts. The rotors overcome friction at breakaway and during rotation. To reduce the breakaway torque and subsequent motor size, high pressure lift oil applications are used. The rotor journals are often supported by a plurality of bearing shoes. One of the reasons for use of tilt-pad journal bearings is the larger misalignment tolerance between the rotor and bearing. To allow for this misalignment capability, the pads must be free to rotate and tilt to properly align the rotor. At the same time, the pads must be retained in the desired circumferential location during handling, installation, and operation. Proper pad to rotor journal alignment is critical for effective hydrostatic operation. The mechanisms that are used to keep the pads in the desired location during handing and installation often inhibit pads from properly aligning with the rotor. If the pad is not properly aligned to the shaft, contact at the outer edges will significantly increase the coefficient of friction and result in a much larger breakaway torque. In addition, the oil film thickness will decrease due to the asymmetric overlay of the rotor onto the lower pads. This situation creates a low pressure zone that allows for the high pressure lift oil to leak out of the bearing without providing the proper lifting force to the rotor. The thinner oil film will potentially allow for more of the pad to come into contact with the rotor and result in a significantly higher breakaway torque. Thus, a more efficient support system for rotor journals is needed.

SUMMARY OF THE INVENTION

A rotor journal support system configured to allow for a bearing shoe to properly align to the rotor while keeping the bearing shoe constrained during handling, installation, and operation limit is disclosed. The rotor journal support system may be configured to enable movement of a bearing shoe such that when the rotor journal is installed and rests upon the bearing shoe, the bearing shoe is properly aligned with the rotor journal, thereby resulting in reduced force needed to turn the rotor journal from a stop than when the bearing shoe is misaligned. In particular, the rotor journal support system, in part, may include a number of embodiments permitting greater movement of the bearing shoe than conventional systems. The rotor journal support system may include one or more bearing shoe supports extending radially outward from the bearing shoe. The bearing shoe support may include an outer bearing surface having at least a partial spherical shape configured to bear against a radially inward surface of the one or more aligning rings. In this position, the bearing shoe support enables the bearing shoe to be moved in any direction other than circumferentially in one direction downward and radially outward. In at least one embodiment, the radially inward surface of the aligning ring is nonspherical. The rotor journal support system may also include a one or more, or a plurality, of pins extending laterally from the bearing shoe to limit the bearing shoe from twisting about an axis extending radially outward from a longitudinal axis of the rotor journal and extending orthogonal to the longitudinal axis of the rotor journal.

In at least one embodiment, the rotor journal support system may include one or more aligning rings forming at least a portion of a cylindrical opening through which a rotor journal may extend. The rotor journal support system may include one or more first retaining plates extending radially inward further than a radially inward surface of the aligning ring. The second retaining plate may extend radially inward further than the radially inward surface of the aligning ring. The second retaining plate may be offset axially from the first retaining plate. The rotor journal support system may include one or more bearing shoes positioned radially inward from the inward surface of the aligning ring. The rotor journal support system may include one or more bearing shoe supports extending from the bearing shoe radially outward to the aligning ring. The bearing shoe support may include an outer bearing surface having at least a partial spherical shape configured to bear against a radially inward surface of the aligning ring. The partial spherical shaped outer bearing surface enables relatively unconfined movement of the bearing shoe.

Movement of the bearing shoe may be limited in a circumferential direction by one or more shoe support pin recesses on an outer side surface of the bearing shoe support and at least one shoe support pin positioned within the shoe support pin recess and extending into the aligning ring. In another embodiment, the shoe support pin may prevent movement of the bearing shoe in a circumferential direction with one or more shoe support pins extending from the at least one aligning ring toward the at least one bearing shoe. The shoe support pin may include a mating surface configured to mate with a mating surface of the at least one bearing shoe support. In another embodiment, the outer bearing surface of the bearing shoe support may extend radially outward into a spherical cavity within the aligning ring. The rotor journal support system may include one or more lift oil feed systems in fluid communication with the spherical cavity within the aligning ring. The lift oil feed system may also include one or more outlets in fluid communication with a radially inner surface of the bearing shoe.

The rotor journal support system may include one or more retaining pins extending from one or more side surfaces of the bearing shoe. The retaining pins may extend axially from the bearing shoe and may contact the adjacent retaining plate to limit the bearing shoe from twisting about the axis to keep the bearing shoe in a desired position. In at least one embodiment, a first retaining pin may extend outwardly from a first side surface of the bearing shoe and generally axially relative to the aligning ring. The first retaining pin may be offset circumferentially along the bearing shoe from a pivot axis of the bearing shoe.

The rotor journal support system may include one or more second retaining pins extending outwardly from a second side surface of the bearing shoe and generally axially relative to the aligning ring. The second retaining pin may extend in a generally opposite direction from the bearing shoe than the first retaining pin. The second retaining pin may be offset circumferentially along the bearing shoe from the pivot axis of the bearing shoe. The first retaining pin and the second retaining pin may be on a same side of the pivot axis of the bearing shoe and may be aligned axially.

The first retaining pin may further include one or more biasing systems that bias the first retaining pin away from the first side surface of the bearing shoe. The biasing system may include one or more springs extending between the first retaining pin and the bearing shoe. In at least one embodiment, the biasing system may include a plurality of flexible arms forming Belleville washers extending from side surfaces of a cavity in the bearing shoe in which the first retaining pin is partially received. In another embodiment, the biasing system may include a plurality of flexible arms forming Belleville washers extending from side surfaces of a cavity in the bearing shoe in which the first retaining pin is partially received. At least a portion of the flexible arms extending from a first cavity side surface contact a collar extending laterally from the first retaining pin and at least a portion of the flexible arms extending from a second cavity side surface contacts the collar extending laterally from the first retaining pin.

The rotor journal support system may also include a lift oil feed system in fluid communication with one or more cavities in which the first retaining pin resides. The lift oil feed system may also include one or more seal rings extending around the first retaining pin thereby sealing the first retaining pin to surfaces forming the cavity. The lift oil feed system may include one or more outlets in communication with the cavity to exhaust fluid into the cavity sealed by the seal ring extending around the first retaining pin.

In at least one embodiment, the rotor journal support system may also include one or more third retaining pins extending outwardly from the first side surface of the bearing shoe and generally axially relative to the aligning ring. The third retaining pin may be offset circumferentially along the bearing shoe from the pivot axis of the bearing shoe on an opposite side of the pivot axis from the first retaining pin. The rotor journal support system may also include one or more fourth retaining pins extending outwardly from the second side surface of the bearing shoe and generally axially relative to the aligning ring. The second retaining pin may extend in a generally opposite direction from the bearing shoe than the first and third retaining pins. The fourth retaining pin may be offset circumferentially along the bearing shoe from the pivot axis of the bearing shoe on an opposite side of the pivot axis from the second retaining pin.

The rotor journal support system may also include one or more bearing shoe supports extending from the bearing shoe radially outward to the aligning ring. The bearing shoe support may include one or more shoe support pin recesses on an outer side surface of the bearing shoe support and shoe support pin positioned within the shoe support pin recess and extending into the aligning ring. In another embodiment, the rotor journal support system may include one or more bearing shoe supports extending from the bearing shoe radially outward to the aligning ring and shoe support pin extending from the aligning ring toward the bearing shoe. The shoe support pin may include one or more a mating surfaces configured to mate with a mating surface of the shoe support.

In another embodiment, the rotor journal support system may include one or more bearing shoe supports extending from the bearing shoe radially outward to the aligning ring, whereby a radially outer surface of the bearing shoe support is at least partially spherical and extends radially outward into a spherical cavity within the aligning ring. The rotor journal support system may include a lift oil feed system in fluid communication with the spherical cavity within the aligning ring. The lift oil feed system may include one or more outlets in fluid communication with a radially inner surface of the bearing shoe.

An advantage of the rotor support system is that the system enables a bearing shoe to have a degree of misalignment between the rotor journal and the bearing shoe while preventing misalignment of the bearing shoe while a rotor journal is installed.

Another advantage of the rotor support system is that the system enables the bearing shoe support enables the bearing shoe to be moved in any direction other than circumferentially in one direction downward and radially outward.

Still another advantage of the rotor support system is that the movement of the bearing shoe may be limited in a circumferential direction by one or more shoe support pin recesses on an outer side surface of the bearing shoe support and one or more shoe support pins positioned within the shoe support pin recess and extending into the aligning ring.

Another advantage of the rotor support system is that the system limits rotation of one or more bearing shoes about an axis orthogonal to a longitudinal axis of a rotor journal and orthogonal to a pivot axis of the bearing shoe during installation of a rotor journal to keep the bearing shoe properly aligned with the rotor journal such that the torque needed to begin rotating the rotor journal from a stationary position is minimal.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 3 is a partial perspective side view of an aligning ring supporting a bearing shoe of the rotor journal support system.

FIG. 4 is a side view of a bearing shoe positioned within an aligning ring of rotor journal support system and a bearing shoe support with a partially spherical radially outer surface.

FIG. 5 is a detailed view of a bearing shoe support supporting the bearing shoe of the rotor journal support system and a bearing shoe support with a partially spherical radially outer surface of FIG. 4.

FIG. 6 is a cross-sectional view of the bearing shoe support supporting the bearing shoe of the rotor journal support system and a shoe support pin positioned within a shoe support pin recess, taken along section line 6-6 in FIG. 5.

FIG. 7 is a side detail view of a bearing shoe support pivoting about a shoe support pin of FIG. 5.

FIG. 8 a side view of a bearing shoe positioned within an aligning ring of rotor journal support system and a bearing shoe support with a partially spherical radially outer surface.

FIG. 9 is a detailed view of a bearing shoe support supporting the bearing shoe of the rotor journal support system and a bearing shoe support with a partially spherical radially outer surface of FIG. 8.

FIG. 10 is a cross-sectional view of the bearing shoe support supporting the bearing shoe of the rotor journal support system and a shoe support pin with a mating surface that mates with a mating surface of the bearing shoe support, taken along section line 10-10 in FIG. 9.

FIG. 11 is a side detail view of a bearing shoe support pivoting about a shoe support pin of FIG. 9.

FIG. 12 is a side view of a bearing shoe support positioned within an aligning ring of rotor journal support system and a bearing shoe support with a partially spherical radially outer surface received within a spherical cavity in the aligning ring.

FIG. 13 is a detailed view of a bearing shoe support of FIG. 12 supporting the bearing shoe of the rotor journal support system, whereby the bearing shoe support has a generally cylindrical outer support surface and a partially spherical radially outer surface received within a spherical cavity in the aligning ring.

FIG. 17 is a cross-sectional front view of another embodiment of a bearing shoe of the rotor journal support system with a retaining pin taken at section line 14-14 in FIG. 3.

FIG. 18 is a cross-sectional front view of still another embodiment of a bearing shoe of the rotor journal support system with a retaining pin taken at section line 14-14 in FIG. 3.

DETAILED DESCRIPTION OF THE INVENTION

Figure 1:
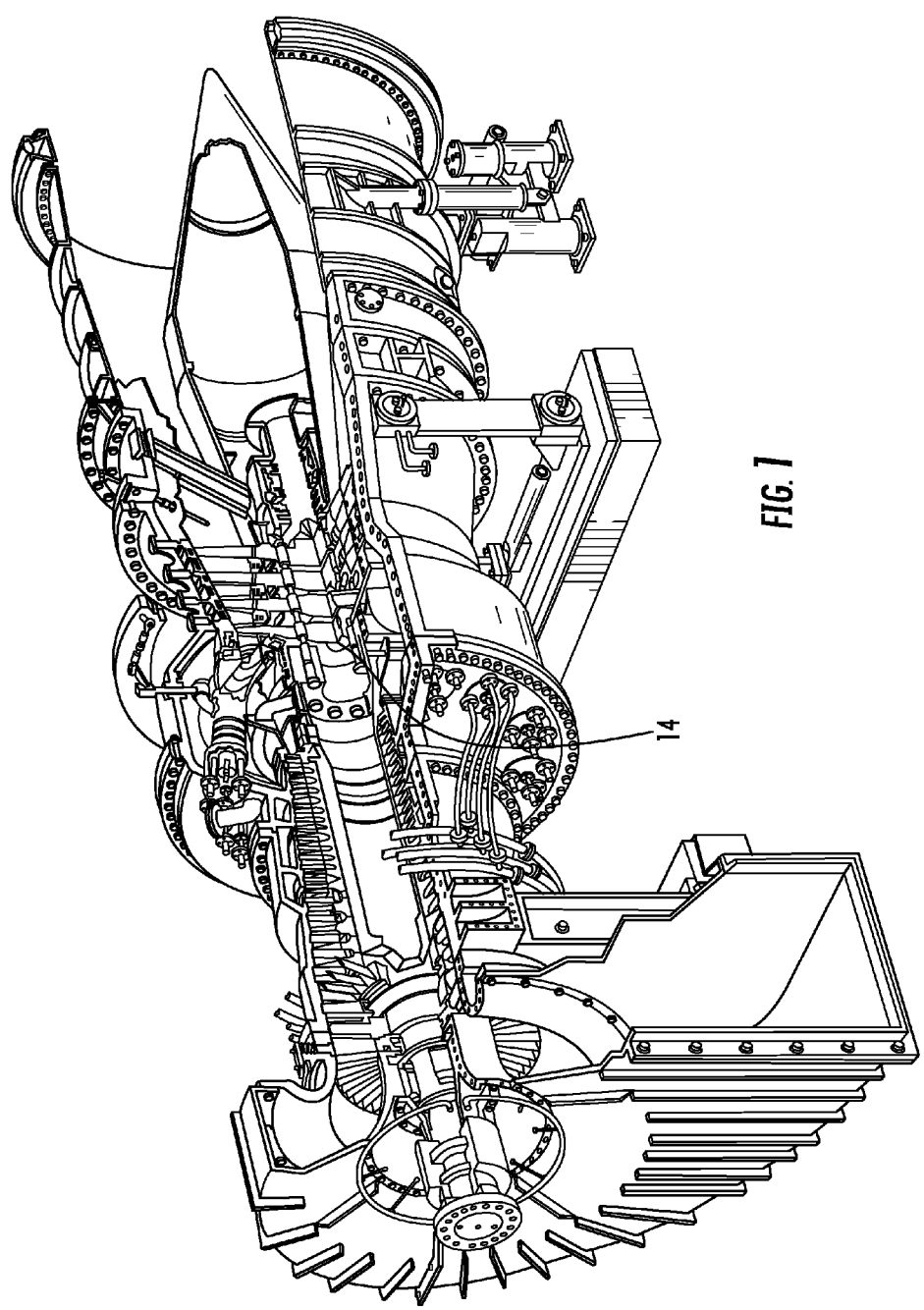
FIG. 1 is a perspective view a rotor journal support system in a gas turbine engine.
Figure 2:
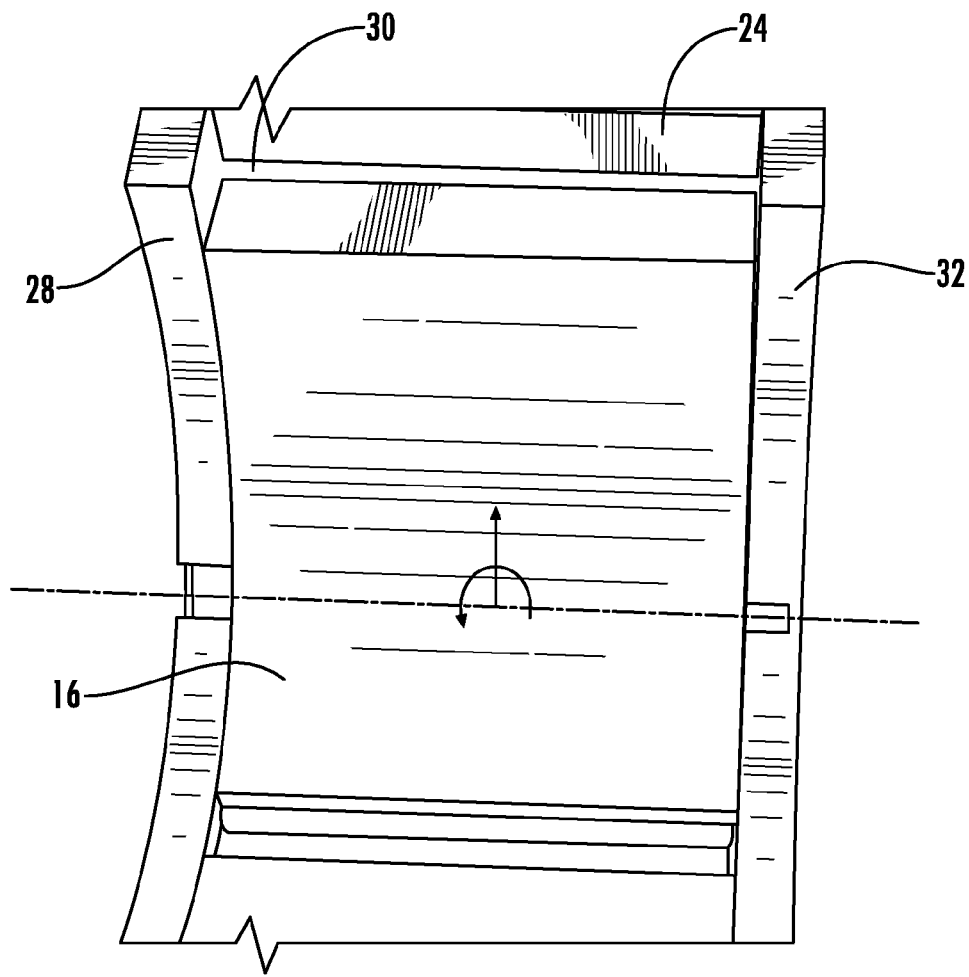
FIG. 2 is a front view of a bearing shoe of the rotor journal support system.

As shown in FIGS. 1-19, a rotor journal support system 10 configured to allow for a bearing shoe 16 to properly align to a rotor 14 while keeping the bearing shoe 16 constrained during handling, installation, and operation limit is disclosed. The rotor journal support system 10 may be configured to enable limited movement of a bearing shoe 16 such that when the rotor journal 14 is installed and rests upon the bearing shoe 16, the bearing shoe 16 is properly aligned with the rotor journal 14, thereby resulting in reduced force needed to turn the rotor journal 14 from a stop than when the bearing shoe 14 is misaligned. In particular, the rotor journal support system 10, in part, may include a number of embodiments permitting greater movement of the bearing shoe 16 than conventional systems. The rotor journal support system 10 may include one or more bearing shoe supports 88 extending radially outward from the bearing shoe 16. The bearing shoe support 88 may include an outer bearing surface 100 having at least a partial spherical shape configured to bear against a radially inward surface 30 of the one or more aligning rings 24. In this position, the bearing shoe support 88 enables the bearing shoe 16 to be moved in any direction other than circumferentially in one direction, as shown with movement arrow 118 in FIG. 7 and movement arrow 124 in FIG. 11. In at least one embodiment, the radially inward surface 30 of the aligning ring 24 is nonspherical. The rotor journal support system 10 may also include a plurality of pins 34 extending laterally from the bearing shoe 16 to limit the bearing shoe 16 from twisting about an axis 20 extending radially outward from a longitudinal axis 22 of the rotor journal 14 and extending orthogonal to the longitudinal axis 22 of the rotor journal 14. The pins 34 may be configured to move along a longitudinal axis of the pins 34. Thus, in at least one embodiment, the pins 34 may not be rigidly attached to the bearing shoe 16.

In at least one embodiment, the rotor journal support system 10 may include one or more aligning rings 24 forming at least a portion of a cylindrical opening 26 through which a rotor journal 14 may extend. The rotor journal support system 10 may include one or more first retaining plates 28 extending radially inward further than a radially inward surface 30 of the aligning ring 24. The rotor journal support system 10 may also include one or more second retaining plates 32 extending radially inward further than the radially inward surface 30 of the aligning ring 24. The second retaining plate 32 may be offset axially from the first retaining plate 28. The bearing shoe 16 may be positioned radially inward from the radially inward surface 30 of the aligning ring 24.

As shown in FIGS. 4-11, the rotor journal support system 10 may include one or more bearing shoe supports 88 extending from the bearing shoe 16 radially outward to the aligning ring 24. The bearing shoe support 88 may include an outer bearing surface 100 having at least a partial spherical shape, as shown in FIGS. 5, 7, 9, 11 and 19, configured to bear against a radially inward surface 30 of the aligning ring 24. In at least one embodiment, the partial spherical shape may be a hemispherical shaped outer bearing surface 100 on a distal end of the bearing shoe support 88. In at least one embodiment, the bearing shoe support 88 may have a generally cylindrical outer surface with a hemispherical shaped outer bearing surface 100 on a distal end of the bearing shoe support 88. In at least one embodiment, as shown in FIGS. 4, 5, 8 and 9, the partially spherical outer bearing surface 100 bearing shoe support 88 bears against the radially inward surface 30 of the aligning ring 24 in which the radially inward surface 30 of the aligning ring 24 is nonspherical. Rather, the radially inward surface 30 of the aligning ring 24 is simply a curved surface having a diameter larger than an outer diameter of a rotor of a turbine engine such that the rotor may be positioned within the aligning ring 24. As such, the partially spherical outer bearing surface 100 of the bearing shoe support 88 provides unlimited movement, restrained only in a single circumferential direction 118, as shown in FIG. 7, and 124, as shown in FIG. 11. Such unconstrained movement enables the bearing shoe 16 to accommodate misalignment of the rotor within the aligning ring 24 while keeping the entire support surface of the bearing shoe 16 engaged to the rotor equally, thereby enabling an oil lift system to function properly.

As shown in FIGS. 4-11, the rotor journal support system 10 may include one or more bearing shoe supports 88 extending from the bearing shoe 16 radially outward to the aligning ring 24. The bearing shoe support 88, as shown in FIGS. 4-6, may include one or more shoe support pin recesses 90 positioned on an outer side surface 92 of the bearing shoe support 88 and one or more shoe support pins 94 positioned within the shoe support pin recess 90 and extending into the aligning ring 24. As shown in FIG. 6, the outer side surface 92 may be a linear side surface and may form only a portion of outer surfaces of the bearing shoe support 88. A shoe support pin 94 may have a diameter equal to or less than a diameter of the shoe support pin recess 90. The shoe support pin 94 may extend from the aligning ring 24 less than a distance between the aligning ring 24 and the bearing shoe 16. In this embodiment, the shoe support pin 94 allows rotation about the shoe support pin 94, shown by movement arrow 112 in FIG. 6, and rotation about the shoe support pin 94 shown by arrow 114 in FIG. 7 such that the bearing shoe support 88 moves from a position in contact with the shoe support pin 94 along a line on the side of the shoe support pin 94 to only in contact at a point 116 on the shoe support pin 94, as shown in FIG. 7. The shoe support pin 94 limits circumferential movement of the bearing shoe support 88 about the longitudinal axis of the aligning ring 24 in the direction of arrow 118.

In another embodiment, the bearing shoe support 88, as shown in FIGS. 8-10, may include one or more bearing shoe supports 88 extending from the bearing shoe 16 radially outward to the aligning ring 24 and one or more shoe support pins 94 extending from the aligning ring 24 toward the bearing shoe 16. The shoe support pin 94 may include a mating surface 96 configured to mate with a mating surface 98 of the shoe support 88. A shoe support pin 94 may have a diameter equal to or less than a diameter of the shoe support pin recess 90. The shoe support pin 94 may extend from the aligning ring 24 less than a distance between the aligning ring 24 and the bearing shoe 16. In this embodiment, the shoe support pin 94 allows rotation about a centerline of the bearing shoe support 88, shown by movement arrow 120 in FIG. 10, and rotation about the shoe support pin 94 shown by arrow 122 in FIG. 11 such that the bearing shoe support 88 moves from a position in contact with the shoe support pin 94 along a line on the side of the shoe support pin 94 to only in contact at a point 126 on the shoe support pin 94, as shown in FIG. 11. The shoe support pin 94 limits circumferential movement of the bearing shoe support 88 about the longitudinal axis of the aligning ring 24 in the direction of arrow 124.

In another embodiment of the rotor journal support system 10, as shown in FIGS. 12-13, the rotor journal support system 10 may include one or more bearing shoe supports 88 extending from the bearing shoe 16 radially outward to the aligning ring 24. A radially outer surface 100 of the bearing shoe support 88 may be at least partially spherical and may extend radially outward into a spherical cavity 102 within the aligning ring 24. The rotor journal support system 10 may further include a lift oil feed system 104 in fluid communication with the spherical cavity 102 within the aligning ring 24. The lift oil feed system 104 may include one or more outlets 106 in fluid communication with a radially inner surface 108 of the spherical cavity 102 within the aligning ring 24. The lift oil feed system 104 may be configured to provide oil to the interface between the radially outer bearing surface 100 of the bearing shoe support 88 and the radially inner surface 108 of the spherical cavity 102 within the aligning ring 24 to reduce the friction to enable easier movement of the bearing shoe 16.

As shown in FIGS. 6, 10 and 14-18, the rotor journal support system 10 may include one or more retaining pins 34 extending from one or more side surfaces 36 of the bearing shoe 16. The retaining pins 34 may extend axially from the bearing shoe 16 and may contact the adjacent retaining plate 28, 32 to limit the bearing shoe 16 from twisting about the axis 20 to keep the bearing shoe 16 in a desired position. In at least one embodiment, the rotor journal support system 10 may include at least one retaining pin 34 extending axially from each side surface 36 near a corner 38. As such, the rotor journal support system 10 may include four retaining pins 34 extending from one or more side surfaces 36 of the bearing shoe 16. One or more of the retaining pins 34 may have a generally cylindrical cross-sectional area or other appropriate configuration. The retaining pins 34 may be positioned on the side surfaces 36 of the bearing shoe 16 such that the retaining pins 34 may contact the surfaces of the first or second retaining plates 28, 32. In at least one embodiment, the retaining pins 34 may contact the outer surfaces of the first or second retaining plates 28, 32 and not in orifices or other cavities in the first or second retaining plates 28, 32.

In at least one embodiment, the rotor journal support system 10 may include one or more first retaining pins 40 extending outwardly from a first side surface 42 of the bearing shoe 16 and generally axially relative to the aligning ring 24. The first retaining pin 40 may be offset circumferentially along the bearing shoe 16 from a pivot axis 44 of the bearing shoe 16. One or more second retaining pins 46 may extend outwardly from a second side surface 48 of the bearing shoe 16 and generally axially relative to the aligning ring 24. The second retaining pin 46 may extend in a generally opposite direction from the bearing shoe 16 than the first retaining pin 40. The second retaining pin 46 may be offset circumferentially along the bearing shoe 16 from the pivot axis 44 of the bearing shoe 16. The first retaining pin 40 and the second retaining pin 46 may be on a same side of the pivot axis 44 of the bearing shoe 16 and may be aligned axially.

Figure 14:
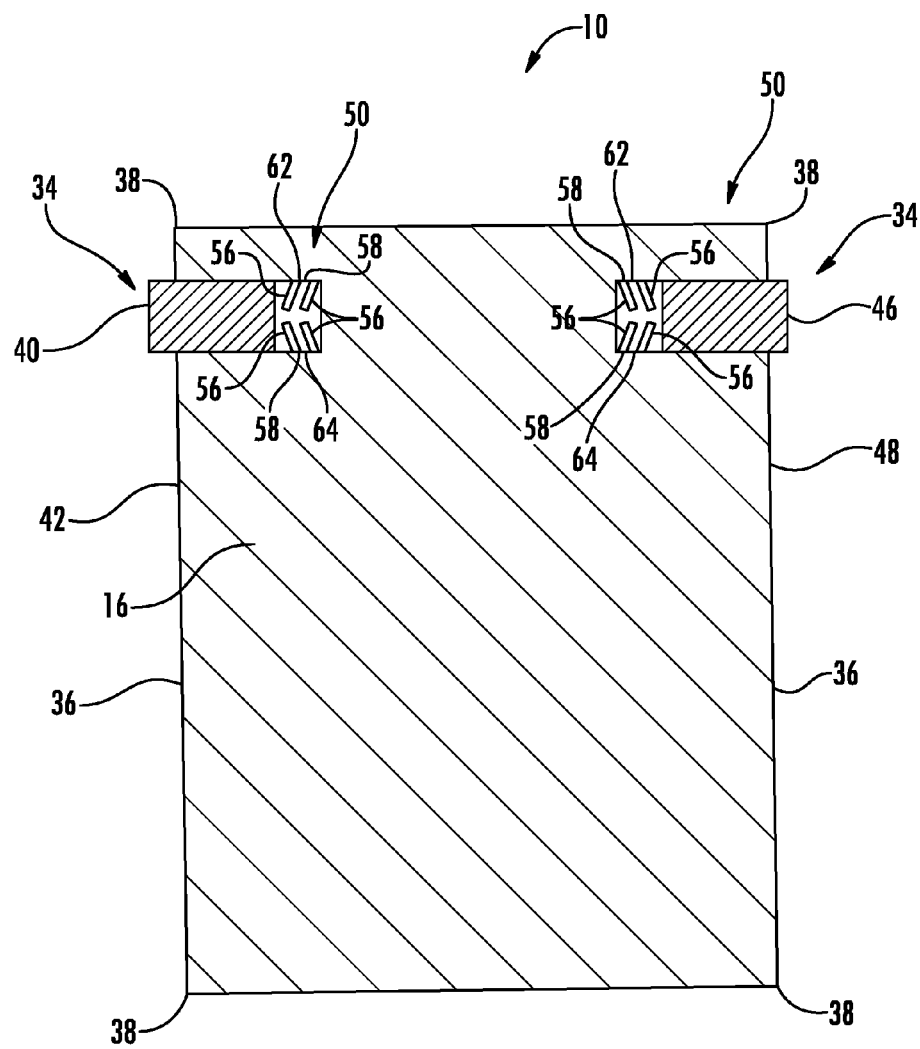
FIG. 14 is a cross-sectional front view of another embodiment of a bearing shoe of the rotor journal support system with a retaining pin taken at section line 14-14 in FIG. 3.
Figure 15:
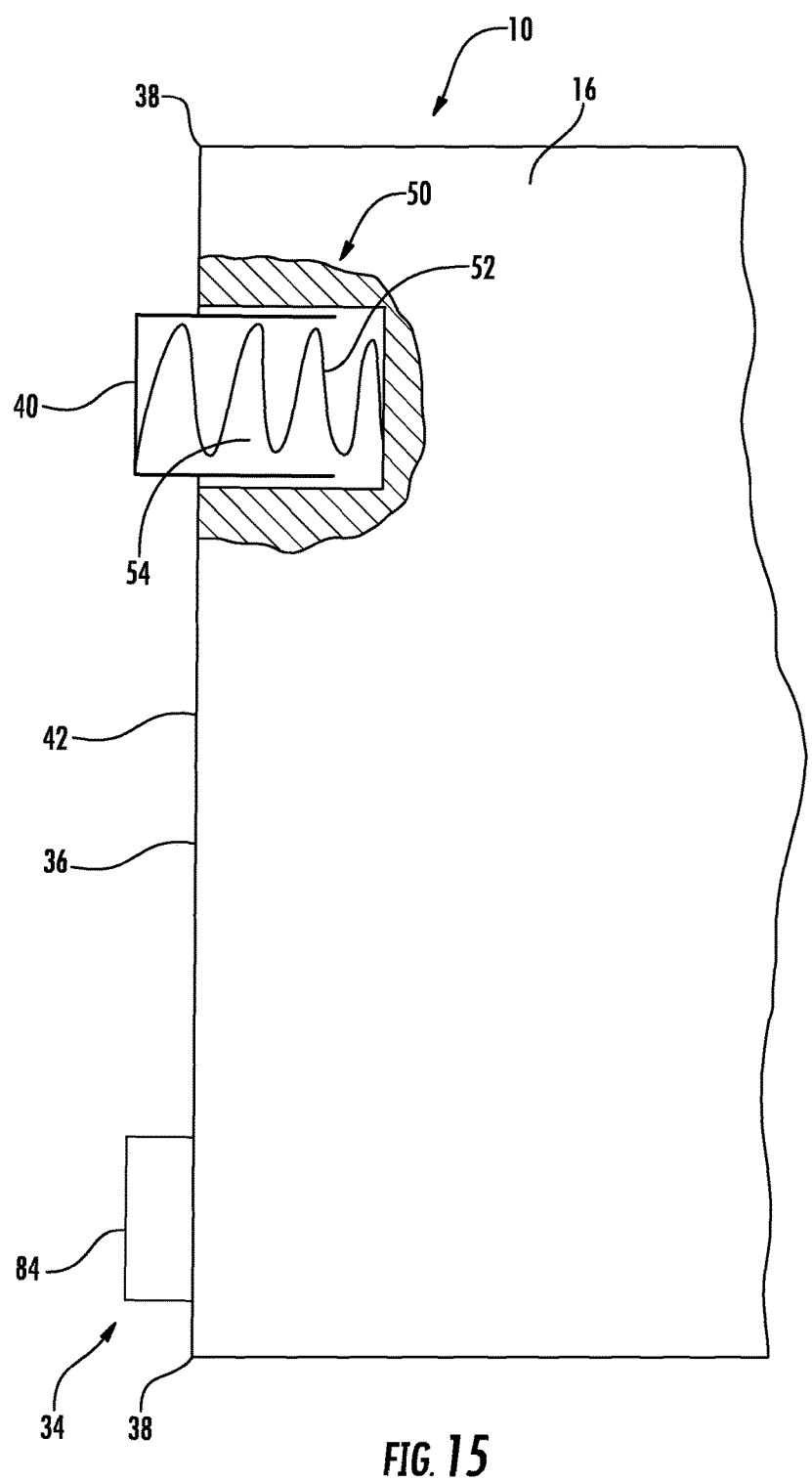
FIG. 15 is a partial cross-sectional front view of another embodiment of the bearing shoe of the rotor journal support system with a retaining pin.

The first retaining pin 40 may also include one or more biasing systems 50 that biases the first retaining pin 40 away from the first side surface 42 of the bearing shoe 16. In at least one embodiment, as shown in FIG. 15, the biasing system 50 may include one or more springs 52 extending between the first retaining pin 40 and the bearing shoe 16. The first retaining pin 40 may include one or more internal cavities 54 that receives a portion of the spring 52 extending between the first retaining pin 40 and the bearing shoe 16. In another embodiment, as shown in FIG. 14, the biasing system 50 may include a plurality of flexible arms 56 forming Belleville washers extending from side surfaces 58 of a cavity 60 in the bearing shoe 16 in which the first retaining pin 40 is partially received. The biasing system 50 may be formed from flexible arms 56 forming the Belleville washers extending from a first cavity side surface 62 at least partially toward flexible arms 56 forming the Belleville washers extending from a second cavity side surface 64 and partially outwardly in a direction in which the first retaining pin 40 extends.

In another embodiment, as shown in FIGS. 17 and 18, the biasing system 50 may include a plurality of flexible arms 56 forming Belleville washers extending from side surfaces 58 of a cavity 60 in the bearing shoe 16 in which the first retaining pin 40 is partially received. At least a portion of the flexible arms 56 extending from a first cavity side surface 62 may contact a collar 66 extending laterally from the first retaining pin 40 and at least a portion of the flexible arms 56 extending from a second cavity side surface 64 contacts the collar 66 extending laterally from the first retaining pin 40. In at least one embodiment, an outer surface 68 of the collar 66 may be generally about flush with the first side surface 42 of the bearing shoe 16.

Figure 16:
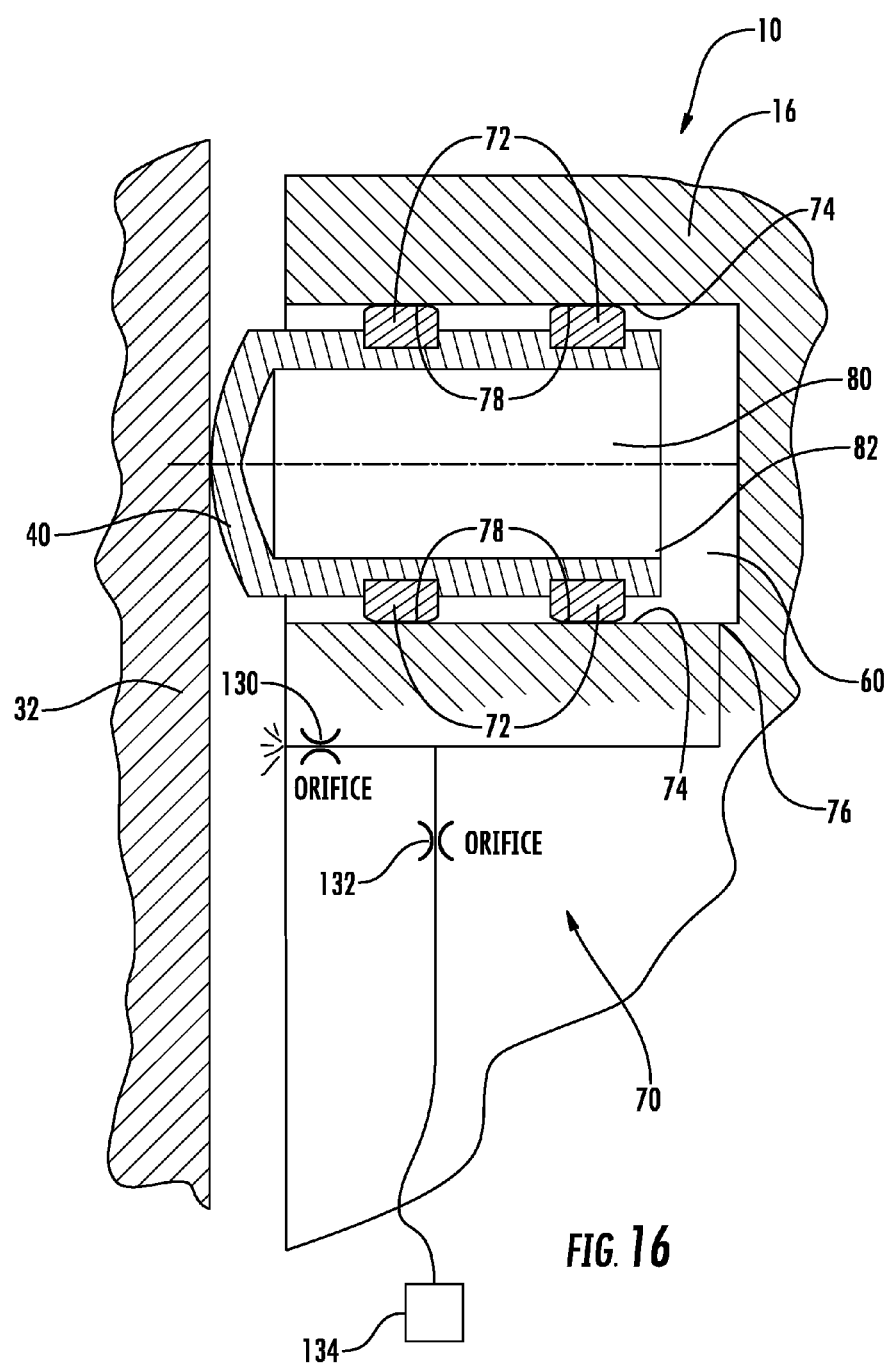
FIG. 16 is a partial cross-sectional front view of yet another embodiment of a bearing shoe of the rotor journal support system with a retaining pin.
Figure 19:
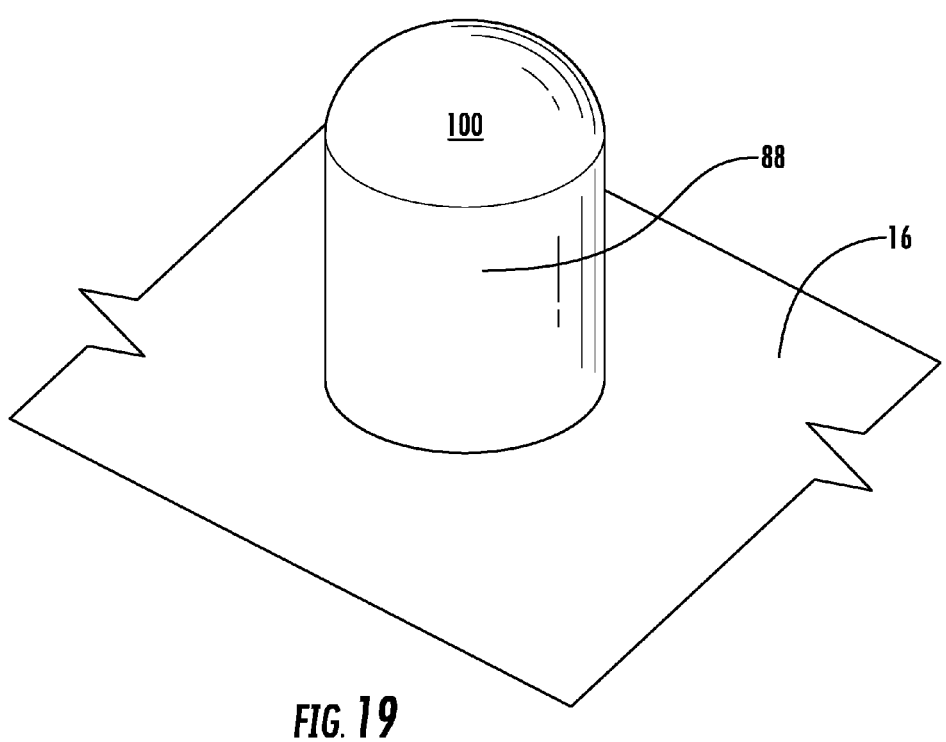
FIG. 19 is a perspective view of a bearing shoe support extending radially outward from a bearing shoe.

The rotor journal support system 10, as shown in FIG. 16, may also include a lift oil feed system 70 in fluid communication with one or more cavities 60 in which the first retaining pin 40 resides. The lift oil feed system 70 may include one or more seal rings 72 extending around the first retaining pin 40 thereby sealing the first retaining pin 40 to surfaces 74 forming the cavity 60. The lift oil feed system 70 may include one or more outlets 76 in communication with the cavity 60 to exhaust fluid into the cavity 60 sealed by the seal ring 72 extending around the first retaining pin 40. In at least one embodiment, the seal ring 72 may be formed from a plurality of ring seals 72 extending around the first retaining pin 40 thereby sealing the first retaining pin 40 to surfaces 74 forming the cavity 60. The seal ring 72 may include an at least partially spherical cross-section whereby a portion of the outer surface 78 contacts the surfaces 74 forming the cavity 60 in which the first retaining pin 40 resides. The first retaining pin 40 may include a hollow internal cavity 80 with an opening 82 facing the bearing shoe 16. The lift oil feed system 70 may include a relief orifice 130 for relieving pressure when the first retaining pin 40 is forced into the cavity 60. A feed orifice 132 may also allow lift oil to be fed back into a lift oil reservoir 134 when the first retaining pin 40 is forced into the cavity 60. The outer surface of the first retaining pin 40 may be partially spherical where the first retaining pin 40 contacts the first or second retaining plate 28, 32.

As shown in FIGS. 6 and 10, a third retaining pin 84 may extend outwardly from the first side surface 42 of the bearing shoe 16 and generally axially relative to the aligning ring 24. The third retaining pin 84 may be offset circumferentially along the bearing shoe 16 from the pivot axis 44 of the bearing shoe 16 on an opposite side of the pivot axis 44 from the first retaining pin 40. One or more fourth retaining pins 86 may extend outwardly from the second side surface 48 of the bearing shoe 16 and generally axially relative to the aligning ring 24. The second retaining pin 46 may extend in a generally opposite direction from the bearing shoe 16 than first and third retaining pins 40, 84. The fourth retaining pin 86 may be offset circumferentially along the bearing shoe 16 from the pivot axis 44 of the bearing shoe 16 on an opposite side of the pivot axis 44 from the second retaining pin 46.

The second, third and fourth retaining pins 46, 84, 86 may be configured as any of the embodiments described for the first retaining pin 40. In at least one embodiment, the first, second, third and fourth retaining pins 40, 46, 84 and 86 may each be configured similarly. In other embodiments, one or more of the first, second, third and fourth retaining pins 40, 46, 84 and 86 may configured to have different configurations of the embodiments described herein or other appropriate configurations.

In at least one embodiment, the retaining pins 34 extending from one or more side surfaces 36 of the bearing shoe 16 may each be contained within orifices in the first and second retaining plates 28, 32. In such embodiments, the orifices in the first and second retaining plates 28, 32 may be sized such that when the bearing shoe 16 is twisted about the axis 20 with the rotor resting on the bearing shoe 16, the orifices are large enough such that the retaining pins 34 do not contact the wall surfaces of the first and second retaining plates 28, 32 forming the orifices. Thus, in such embodiment, the orifices in the first and second retaining plates 28, 32 do not limit movement of the bearing shoe 16 is twisted about the axis 20 with the rotor in place resting on the bearing shoe 16.

During use, the rotor journal support system 10 provides additional freedom of movement of the bearing shoe 16 not found in conventional systems. In particular, when a rotor is being positioned and positioned to rest on the bearing shoe 16 in an alignment ring 24, the partially spherical portion of the radially outer surface 100 of the bearing shoe support 88 contacts the radially inward surface 30 of the aligning ring 24 and enables relatively unlimited movement, constrained only from radially outward movement by the radially inward surface 30 of the aligning ring 24 and circumferential movement in a single direction 118 in FIG. 7 and direction 124 in FIG. 11. As such, the bearing shoe 16 may be free to move such that a uniform load is placed upon the bearing shoe 16 by the rotor which allows a lift oil feed system supplying lift oil to lift oil pockets within the support surface of the bearing shoe 16 to function properly.

In embodiments including retaining pins 34, the retaining pins 34 limit rotation of the bearing shoe 16 about the axis 20 orthogonal to the longitudinal axis 22 of the rotor journal 14 and orthogonal to the pivot axis 44 of the bearing shoe 16 during installation of a rotor journal 14 to keep the bearing shoe 20 properly aligned with the rotor journal 14 such that the torque needed to begin rotating the rotor journal 14 from a stop is as small as possible. The retaining pins 34 limit rotation of the bearing shoe 16 by contacting the first or second retaining plates 28, 32 if the rotor journal 14 causes the bearing shoe 16 to rotate when the rotor journal 14 is being installed. The retaining pins 34, as shown in FIGS. 14-18, may be configured to enable greater rotation about the axis 20 orthogonal to the longitudinal axis 22 of the rotor journal 14 than conventional pins. As such, the bearing shoe 16 may be free to move such that a uniform load is placed upon the bearing shoe 16 by the rotor which allows a lift oil feed system supplying lift oil to lift oil pockets within the support surface of the bearing shoe 16 to function properly.

The foregoing is provided for purposes of illustrating, explaining, and describing embodiments of this invention. Modifications and adaptations to these embodiments will be apparent to those skilled in the art and may be made without departing from the scope or spirit of this invention.

We claim:
1. A rotor journal support system comprising:
   at least one aligning ring forming at least a portion of a cylindrical opening through which a rotor journal may extend;
   at least one first retaining plate extending radially inward further than a radially inward surface of the at least one aligning ring;
   at least one second retaining plate extending radially inward further than the radially inward surface of the at least one aligning ring, and wherein the at least one second retaining plate is offset axially from the at least one first retaining plate;
   at least one bearing shoe positioned radially inward from the inward surface of the at least one aligning ring; and
   at least one bearing shoe support extending from the at least one bearing shoe radially outward to the at least one aligning ring, wherein the at least one bearing shoe support includes an outer bearing surface having at least a partial spherical shape configured to bear against a radially inward surface of the at least one aligning ring,
   at least one first retaining pin extending outwardly from a first side surface of the at least one bearing shoe and generally axially relative to the at least one aligning ring, wherein the at least one first retaining pin is offset circumferentially along the at least one bearing shoe from a pivot axis of the at least one bearing shoe; and
   at least one second retaining pin extending outwardly from a second side surface of the at least one bearing shoe and generally axially relative to the at least one aligning ring, wherein the at least one second retaining pin extends in a generally opposite direction from the at least one bearing shoe than the at least one first retaining pin, and wherein the at least one second retaining pin is offset circumferentially along the at least one bearing shoe from the pivot axis of the at least one bearing shoe.

2. The rotor journal support system of claim 1, further comprising at least one shoe support pin recess on an outer side surface of the at least one bearing shoe support and at least one shoe support pin positioned within the at least one shoe support pin recess and extending into the at least one aligning ring.

3. The rotor journal support system of claim 1, further comprising at least one shoe support pin extending from the at least one aligning ring toward the at least one bearing shoe, wherein the at least one shoe support pin includes a mating surface configured to mate with a mating surface of the at least one bearing shoe support.

4. The rotor journal support system of claim 1, wherein the outer bearing surface of the at least one bearing shoe support extends radially outward into a spherical cavity within the at least one aligning ring and further comprising a lift oil feed system in fluid communication with the spherical cavity within the at least one aligning ring, and wherein the lift oil feed system further comprises at least one outlet in fluid communication with a radially outer bearing surface of the at least one bearing shoe support.

5. The rotor journal support system of claim 1, wherein the at least one first retaining pin and the at least one second retaining pin are on a same side of the pivot axis of the at least one bearing shoe and are aligned axially.

6. The rotor journal support system of claim 1, wherein the at least one first retaining pin further comprises at least one biasing system that biases the at least one first retaining pin away from the first side surface of the at least one bearing shoe.

7. The rotor journal support system of claim 6, wherein the at least one biasing system comprises at least one spring extending between the at least one first retaining pin and the at least one bearing shoe.

8. The rotor journal support system of claim 6, wherein the at least one biasing system comprises a plurality of flexible arms forming Belleville washers extending from side surfaces of a cavity in the at least one bearing shoe in which the at least one first retaining pin is partially received.

9. The rotor journal support system of claim 6, wherein the at least one biasing system comprises a plurality of flexible arms forming Belleville washers extending from side surfaces of a cavity in the at least one bearing shoe in which the at least one first retaining pin is partially received, wherein at least a portion of the flexible arms extending from a first cavity side surface contact a collar extending laterally from the at least one first retaining pin and at least a portion of the flexible arms extending from a second cavity side surface contacts the collar extending laterally from the at least one first retaining pin.

10. The rotor journal support system of claim 1, further comprising a lift oil feed system in fluid communication with at least one cavity in which the at least one first retaining pin resides and further comprising at least one seal ring extending around the at least one first retaining pin thereby sealing the at least one first retaining pin to surfaces forming the at least one cavity, wherein the lift oil feed system includes at least one outlet in communication with the at least one cavity to exhaust fluid into the cavity sealed by the at least one seal ring extending around the at least one first retaining pin.

11. The rotor journal support system of claim 1, further comprising at least one third retaining pin extending outwardly from the first side surface of the at least one bearing shoe and generally axially relative to the at least one aligning ring, wherein the at least one third retaining pin is offset circumferentially along the at least one bearing shoe from the pivot axis of the at least one bearing shoe on an opposite side of the pivot axis from the at least one first retaining pin;

at least one fourth retaining pin extending outwardly from the second side surface of the at least one bearing shoe and generally axially relative to the at least one aligning ring, wherein the at least one second retaining pin extends in a generally opposite direction from the at least one bearing shoe than the at least one first and third retaining pins, and wherein the at least one fourth retaining pin is offset circumferentially along the at least one bearing shoe from the pivot axis of the at least one bearing shoe on an opposite side of the pivot axis from the at least one second retaining pin.

* * * * *